United States Patent

[11] 3,607,747

[72] Inventors Toshikatsu Ishikawa
Tokyo;
Tamotsu Hori, No. 28-2, Higashi-Machi, Tojiin, Kita-ku, Kyoto, both of Japan
[21] Appl. No. 825,660
[22] Filed May 19, 1969
[45] Patented Sept. 21, 1971
[73] Assignee Nippon Carbon Company Limited
Tokyo, Japan
and said Hori
[32] Priority May 27, 1968
[33] Japan
[31] 43/35,439

[54] LUBRICANT COMPRISING A NOVEL LUBRICATING IMPROVER OF INORGANIC GRAPHITE FLUORIDE
6 Claims, 10 Drawing Figs.

[52] U.S. Cl. .................................................. 252/18,
72/42, 252/12, 252/16, 252/25, 252/28, 252/29,
252/30, 252/58, 252/305
[51] Int. Cl. ........................................................ C10m 1/10
[50] Field of Search ............................................ 252/16, 58,
18, 25, 28, 29, 30, 12, 305; 72/42

[56] References Cited
UNITED STATES PATENTS

| | | | |
|---|---|---|---|
| 2,833,721 | 5/1958 | Hilliker et al. ................ | 252/56 |
| 2,877,182 | 3/1959 | May ............................ | 252/28 |
| 2,986,519 | 5/1961 | King ............................ | 252/30 |
| 3,011,975 | 12/1961 | Nitzsche et al. .............. | 252/28 |
| 3,198,735 | 8/1965 | Lamson et al. ................ | 252/29 |
| 3,213,024 | 10/1965 | Blake et al. ................... | 252/25 |
| 3,244,626 | 4/1966 | Lyons et al. .................. | 252/29 |
| 3,377,279 | 4/1968 | Sibert .......................... | 252/30 |
| 3,377,280 | 4/1968 | Knappwost ................... | 252/30 |
| 3,396,108 | 8/1968 | Caruso ......................... | 252/18 |
| 3,397,087 | 8/1968 | Yoshizawa et al. ............ | 117/121 |

*Primary Examiner*—Daniel E. Wyman
*Assistant Examiner*—I. Vaughn
*Attorney*—Stevens, Davis, Miller & Mosher

ABSTRACT: Lubricants having excellent physical properties are composed of a base oil usually used and a high molecular weight inorganic graphite fluoride having a formula of $(CF)_n$ as an improver. Graphite fluoride is produced by reacting carbon or graphite with fluorine, halogen fluoride or a higher fluorine compound at a temperature of lower than 550° C.

LUBRICANT COMPRISING A NOVEL LUBRICATING IMPROVER OF INORGANIC GRAPHITE FLUORIDE

The present invention relates to a lubricating improver, more particularly a lubricating improver consisting mainly of graphite fluoride.

The recent lubricant requires to provide cold effect, anticorrosion, extreme pressure resistance as well as abrasion prevention. For example, the heretofore known greases are difficulty dissolved in water and therefore they stick satisfactory on friction surface which is flashed with water and do not flow therefrom, so that they are excellent in water resistance but are poor in heat resistance.

Recently, the grease capable of being used for a long time without changing frequently in view of maintenance free has been demanded and in order to satisfy this demand, it has been proposed to add various improvers. As the improvers for adding to grease, for example, solid inorganic substances, such as natural graphite, molybdenum disulfide, etc., have been known. However, the greases added with these inorganic substances have not been always provided with the properties demanded as lubricant. Namely, the greases added with the above described inorganic substances are colored black and therefore the lubricating surface and the rotating surface are stained.

Relating to this point, the inventors have made study with respect to an effect of addition of a substance consisting mainly of graphite fluoride and as the result it has been found that the lubricant added with graphite fluoride has superior properties to the conventional known grease in the described points.

The greases contemplated in this invention correspond to No. 0 to 6 NLGI (U.S. Grease Association) by classifying in view of consistency, and they have a penetration (mm.) at 77° F. being about 85 to 385 according to ASTMD217–52T. Furthermore, they are classified as follows in view of the kind of soap.

Calcium soap grease

Sodium soap grease

Aluminum soap grease

Mixed soap grease

Lithium soap grease

Barium soap grease

The base of these greases is mineral oil. As other synthetic greases, there are greases composed of bentonite, silicagel, copper phthalocyanine or allyl urea and a base of silicone oil or diester oil.

As mentioned above, as lubricating inorganic improvers to be added to grease, graphite and molybdenum disulfide have been recommended, because graphite and molybdenum disulfide are provided with such a property that they readily stick on a metal and therefore when these inorganic substances are used as a lubricant, namely when they are used as a powdery lubricant, a very excellent lubricating effect can be developed and further it has been considered that when they are used as an improver, an excellent lubricating effect will also be developed.

On the contrary, graphite fluoride is not provided with such a property that it readily sticks on a metal and therefore when graphite fluoride is used as powdery lubricant, it does not show preferable property as compared with molybdenum disulfide.

Figure 1:
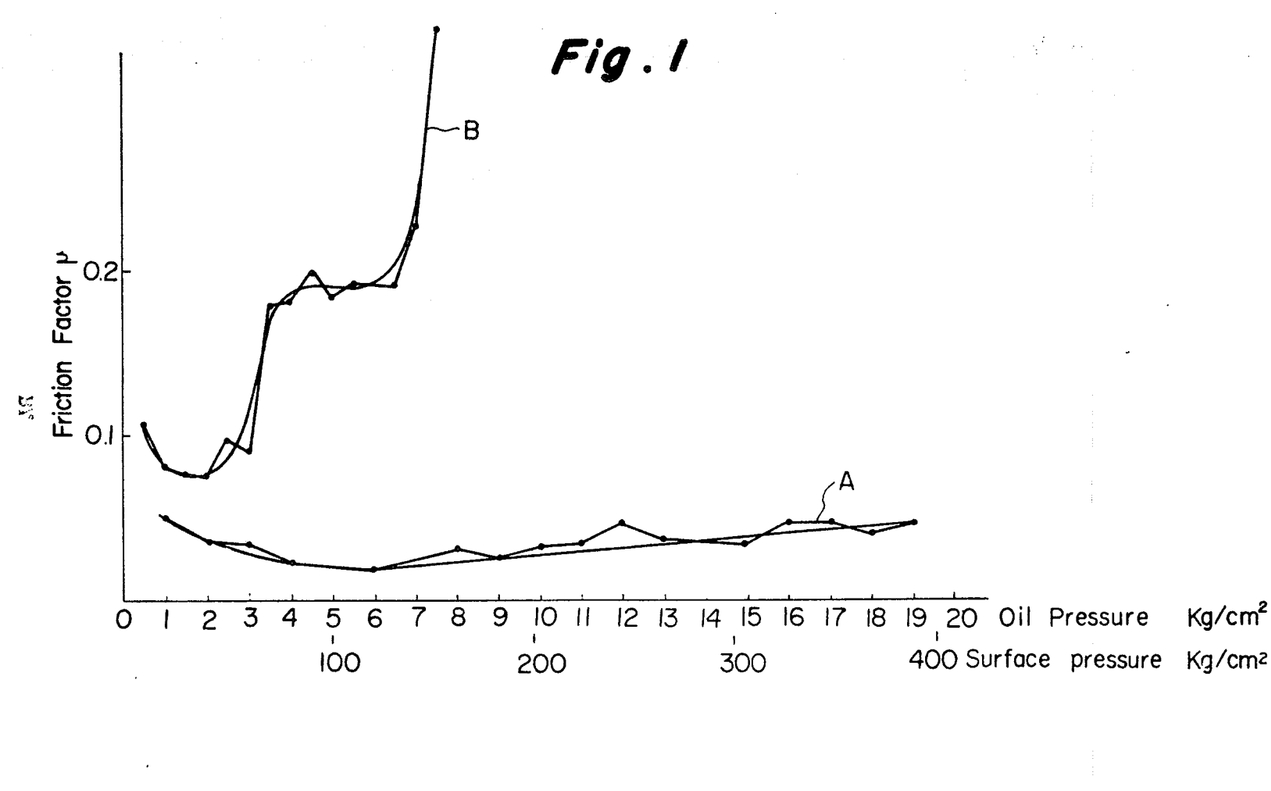

For example, FIG. 1 is a graph showing the result obtained by testing the relation of pressure-friction factor of powdery molybdenum disulfide (A) and powdery graphite fluoride (B) by means of Soda's four ball tester (Shell type) as described hereinafter. According to FIG. 1, the friction factor of molybdenum disulfide is stable to a fairly high extreme pressure but the friction factor of graphite fluoride is not so stable in a broad pressure range as in molybdenum disulfide.

Therefore, it has been heretofore considered that molybdenum disulfide is best as a powdery lubricant and a lubricating improver and it has been very frequently used by adding to grease. On the contrary, the effect of addition of graphite fluoride has never been found and graphite fluoride has not been used as a powdery lubricant nor as an improver and it has neither been produced nor been commercially available.

Figure 2:
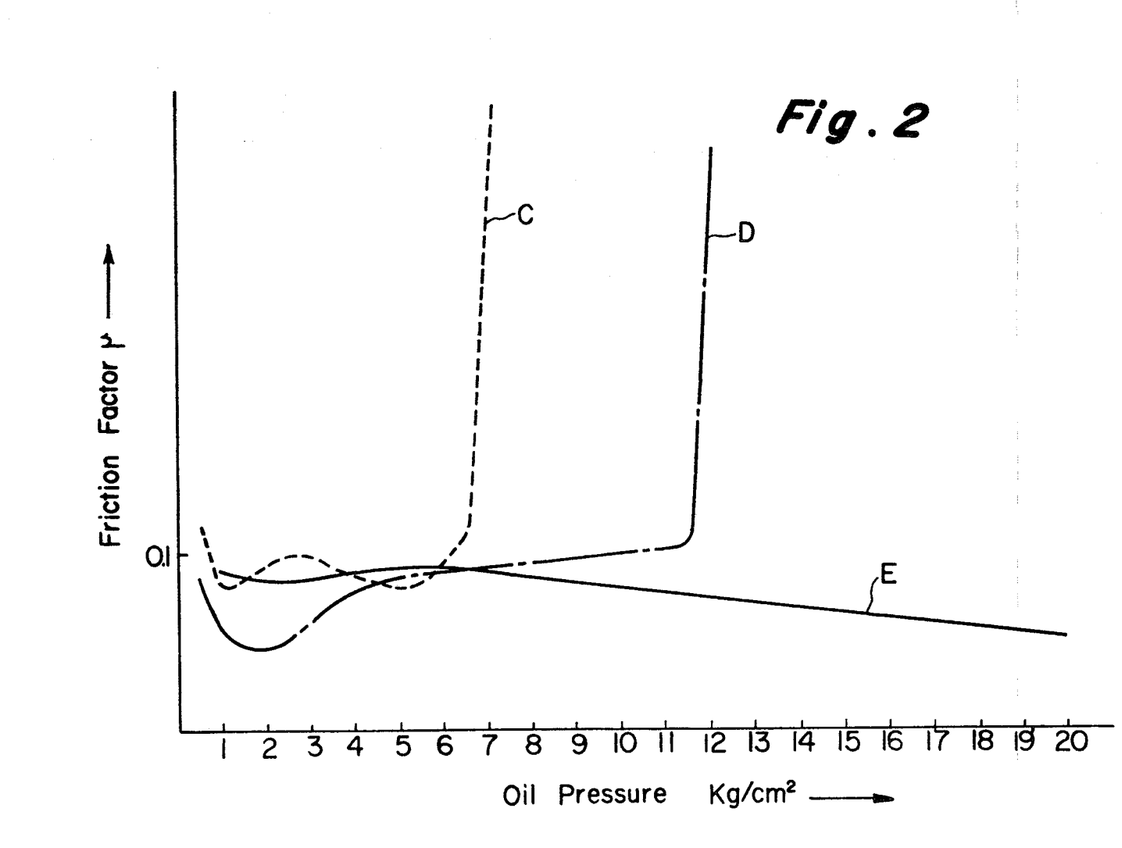

The inventors have studied with respect to effect of addition of graphite fluoride and found a surprising effect as shown in FIG. 2.

Namely, FIG. 2 shows the result obtained by testing the pressure-friction factor of a fiber grease (C) added with 10% by weight of powdery molybdenum disulfide, a fiber grease (D) added with 10% by weight of molybdenum disulfide, which has been commercially available as a grease for high temperature and a fiber grease (E) added with 10% by weight of graphite fluoride.

In this test, as mentioned above, the fiber greases (C) and (E) were prepared by adding 10% by weight of the most high grade molybdenum disulfide having a mean grain size of less than 0.5 $\mu$ and graphite fluoride explained hereinafter in detail respectively to a commercially available fiber grease having a consistency at 25° C. of 250±20 and a dropping point of higher than 130° C. and the fiber grease (D) was a commercially available one for high temperature having a consistency of 265 and containing 10% by weight of molybdenum disulfide. As the result of this test, it has been found that a synergistic effect which has never been expected from the relation of pressure-friction factor of powdery molybdenum disulfide and powdery graphite fluoride in FIG. 1, appears.

Namely, the limiting pressure point of the grease (C) added with 10% by weight of molybdenum disulfide is 7 Kg./cm.$^2$ and the limiting pressure point of the commercially available grease (D) already added with 10% by weight of molybdenum disulfide is 12 Kg./cm.$^2$, while the fiber grease (E) added with 10% by weight of graphite fluoride is stable within a broad pressure range.

In this case, the difference between the greases (C) and (D) is based on the following reason. The grease (D) is added with the other third component, such as stearic acid, lauric acid, diester oil and silicone oil (methyl series, phenyl series) in addition to molybdenum disulfide and the effect of molybdenum disulfide is promoted by the third component. From the result of test in FIG. 2, it has been found that the effect of addition of graphite fluoride is much higher than that of molybdenum disulfide. Furthermore, it is possible to use molybdenum disulfide, graphite, tungsten sulfide, lead oxide, boron nitride and the like as the other component together with graphite fluoride.

It has been also found that graphite fluoride shows the above described effect when it is added to usual liquid lubricating oils such as spindle oil, machine oil, hydraulic oil, gear oil, engine oil, etc. Furthermore, it has been found that when a solution of graphite fluoride has been separately prepared and this solution is added to a commercially available lubricating oil upon the use, the similar excellent effect can be obtained.

Namely, the following Examples 6 to 9 are embodiments thereof and from Example 6, it can be seen that the result in the tester is excellent and it can be proved from Examples 7 to 9 that graphite fluoride can be used for mobile oil, gear oil and cutting oil respectively. Furthermore, graphite fluoride is effective for spindle oil, ice machine oil, dynamo oil, turbine oil, machine oil, marine engine oil, diesel engine oil, cylinder oil, axial oil, compressor oil and the like. The oils added with graphite fluoride show the effect apparently, as the load applied to the oils is larger and consequently graphite fluoride can be referred to as improver for extreme pressure.

The production of the main component of inorganic high molecular weight graphite fluoride of the improver of this invention has been disclosed in the same applicant's patent (British Pat. No. 1,049,582; U.S. Pat. No. 3,397,087). Namely, graphite fluoride is produced by carbon or graphite with fluorine, halogen fluoride or a mixture thereof or a mixture of these substances with an inert gas or a higher fluorine compound at a temperature of lower than 550° C. and the configuration is as follows. That is, fluorine is introduced between layer lattice structures of graphite or carbon and chemically bonded with one remaining valence electron in the carbon atom in a covalent bond and the molecular formula is expressed by $(CF)n$ and the molar ratio of carbon to fluorine is completely 1:1 and this compound is colorless or white solid powder.

The graphite fluoride is an inorganic high molecular weight substance and therefore it does not soften nor burn at a high temperature different from the case of, for example, ethylene tetrafluoride and is stable up to a temperature of 550° C. under an atmospheric pressure. The graphite fluoride has a specific gravity of 2.00 to 2.70, a stable anticorrosion against chemicals such as acids, alkalis and the like, a heat resistance and a high electric resistance.

When powdery carbon or graphite is reacted completely with fluorine, powdery graphite fluoride can be obtained. However, when the powdery carbon or graphite is reacted with fluorine insufficient to react with carbon or graphite or the reaction is stopped halfway, graphite fluoride is formed only on the surface layer and the inner part remains in carbon or graphite as such. However, even when only the surface layer is converted into graphite fluoride, the lubricating property has relation to only the surface layer, so that there is no influence when the pressure to be applied is low. Namely, the lubricating property of graphite fluoride of the surface layer is very high and consequently unless a particularly high pressure is applied, the film of graphite fluoride is not broken and even if the film of graphite fluoride is broken, the inner part is formed with carbon having lubricating property and therefor it is convenient.

Graphite fluoride is usually powdery but when it is used as a lubricating improver, it is preferable to adjust the mean grain size of graphite fluoride to less than 10 $\mu$, because it is preferable to make the mean grain size of graphite fluoride as small as possible as in the case of molybdenum disulfide, in order to disperse graphite fluoride favorably in lubricant.

Then an illustration will be made with respect to addition of graphite fluoride to lubricant. Graphite fluoride may be added in a conventional manner. For example, graphite fluoride may be added in the same manner as in the case of preparation of lubricant by adding molybdenum disulfide. Alternatively it may be added to an already prepared lubricant, for example, a commercially available lubricant. In this case, it is effective to apply physical means, such as, stirring or proper heating or to add a dispersing agent, but it need not always to add these means.

Then, an illustration will be made with respect to a relation of an amount of graphite fluoride added.

Firstly, an influence of the upper limit of amount of graphite fluoride added will be explained.

Figure 3:
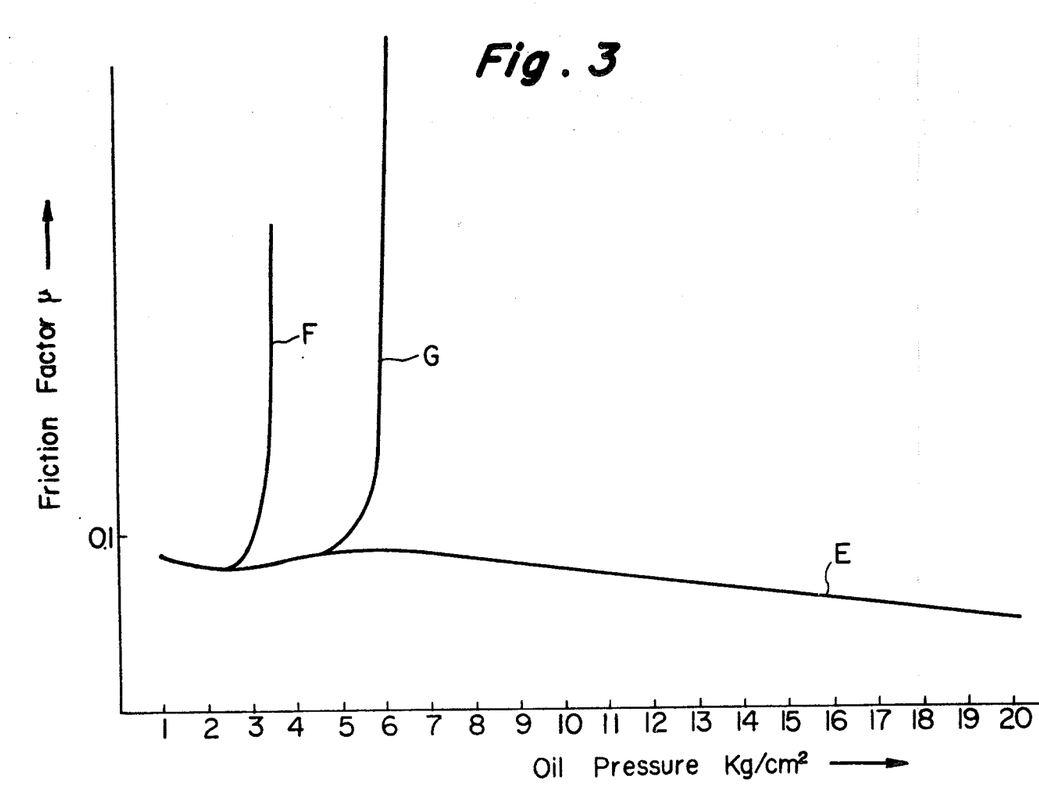

FIG. 3 is a graph showing a relation of pressure-friction factor obtained by a comparative test of a fiber grease alone and a grease added with graphite fluoride by means of SODA's four ball tester as described hereinafter. In FIG. 3, the limiting pressure point is an oil pressure of 3.5 Kg./cm.$^2$ in the fiber grease alone (F), while the limiting pressure point of the fiber grease (G), in which 3% by weight of graphite fluoride is added to the fiber grease (F) is an oil pressure of 6 Kg./cm.$^2$. The limiting pressure point of a grease (E), in which 10% by weight of graphite fluoride is added to the fiber grease (F), is not found at an oil pressure of 20 Kg./cm.$^2$ (load per ball:405 Kg./cm.$^2$). This is surprising and shows that graphite fluoride has very excellent property as the improver.

Furthermore, the property of lubricant added with an improver is generally influenced by the improver and also by property of the base of the lubricant itself. For proving this fact, as a base of a lubricant a cup grease having a consistency at 25° C. of 250±15 and a dropping point of higher than 90° C. is used and with respect to this cup grease alone and the cup grease added with graphite fluoride, a comparative test of the same relation as in FIG. 3 was made and the result as shown in FIG. 4 was obtained.

Figure 4:
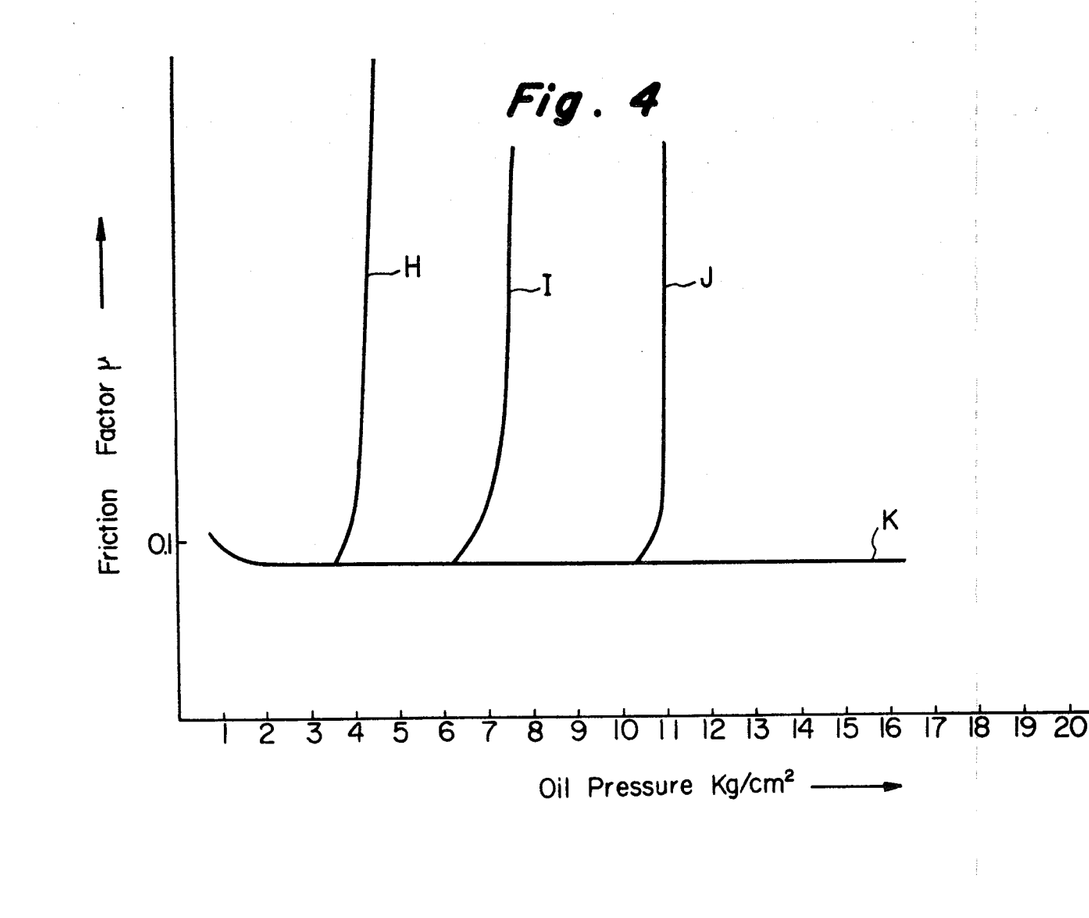

From FIG. 4, it can be seen that in the cup grease alone (H), and oil pressure of 4.5 Kg./cm.$^2$ is the limiting pressure point, in the cup grease (I), in which 3% by weight of graphite fluoride is added to the grease (H), an oil pressure of 7.5 Kg./cm.$^2$ is the limiting pressure point and in the grease (J), in which 10% by weight of graphite fluoride is added to the grease (H), an oil pressure of 11 Kg./cm.$^2$ is the limiting pressure point. Furthermore, in the grease (K), in which 25% by weight of graphite fluoride is added to the grease (H), the limiting pressure point increases considerably and it has been found that the limiting pressure point raises in proportion to the amount of graphite fluoride added.

Accordingly, from the test results of FIGS. 3 and 4, it can be seen that as the amount of graphite fluoride added increases, the limiting pressure point raises and an improved lubricant having a high limiting pressure point can be obtained. However, considering the cost of graphite fluoride, namely, economy of lubricant, it is sufficient to add graphite fluoride of about 50 to 60% by weight in the upper limit.

Then an illustration will be made with respect to the lower limit of amount of graphite fluoride added.

Figure 5:
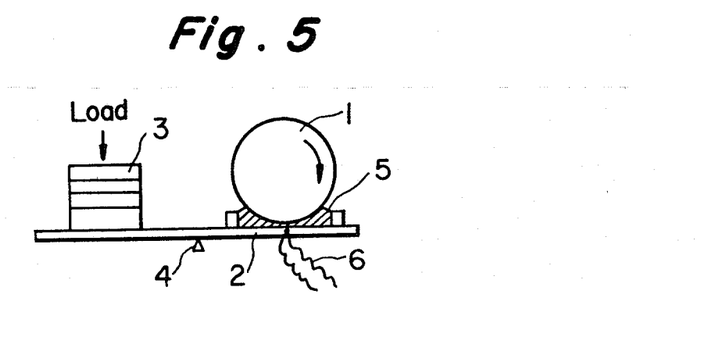

With respect to the lower limit, a measurement was made by means of a tester as shown in FIG. 5. In this tester a fixed cast steel ring 1 is connected directly to a motor (not shown) and the ring 1 is rotated on a steelplate 2 at a periphery velocity of 5.5 m./sec. so as to come the ring into contact with the plate 2 along about 1 cm.$^2$. A load 3 is applied to one end of the plate 2 and this load 3 provides a contacting pressure to the ring 1 through a fulcrum 4 to measure the property of a lubricant 5. Just under the contacting surface there is provided with a thermocouple 6 and by it an increase of temperature due to the rotation of the ring 1 against the plate 2 can be measured.

Figure 6:
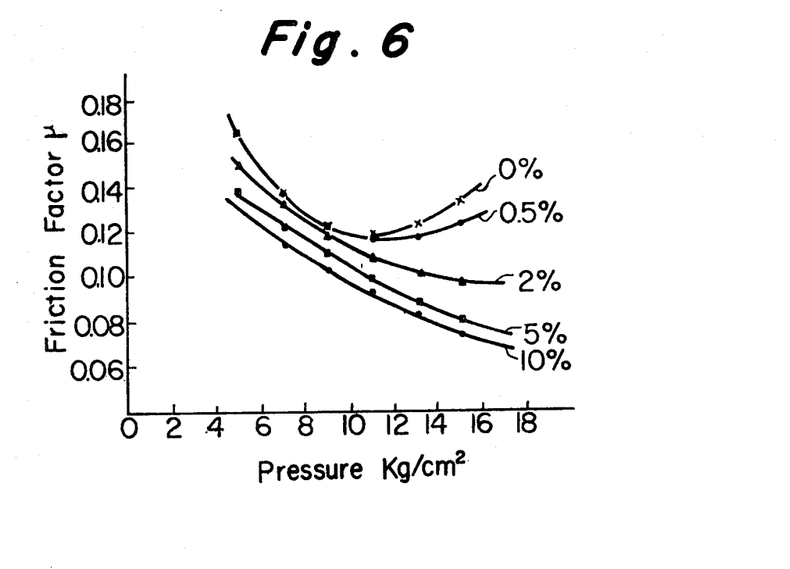

FIG. 6 is a graph showing a test result obtained by using the tester as shown in FIG. 5 with respect to pressure-friction factor when the amount of graphite fluoride added is decreased. From the result in FIG. 6, it has been found that as the amount of graphite fluoride added increases, the addition effect is improved as in the test results of FIGS. 3 and 4.

Moreover, even if the addition amount is very small, for example, about 0.5% by weight, the effect apparently different from that of the grease not added with graphite fluoride has been confirmed in a pressure of more than 10 Kg./cm.$^2$. Accordingly, even when the amount of graphite fluoride added is slight, the addition effect appears and it has been found that the addition of graphite fluoride is particularly effective for lubricant for extreme pressure.

Considering that the friction factor of a bearing and the like relates to PV value, so that a test was made with respect to a relation of PV value to the addition amount.

Figure 7:
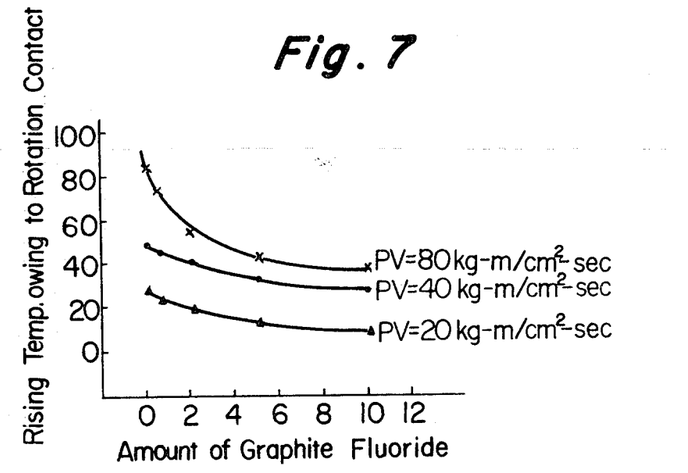

FIG. 7 is a graph showing a test result obtained by using the tester as shown in FIG. 5 with respect to a relation of the amount of graphite fluoride added to the rising temperature owing to the rotating contact in PV values of 80, 40 and 20 KG.-m./cm.$^2$ sec.

From the result, it can be seen that the larger the PV value, the higher the influence of the amount of graphite fluoride added is and that when the PV value is larger, the addition of a very small amount, such as about 0.5% by weight gives a remarkable effect. Therefore, as the load in bearing and the like becomes larger, the effect of graphite fluoride becomes remarkable and it can be seen that the grease added with graphite fluoride has a property for extreme pressure.

Moreover, by further checking the lower limit by a precise measurement it has been found that the effect appears from 0.05% by weight.

In addition to the above described uses, the graphite fluoride according to the present invention can be additionally used for the following compositions.

1. A paste produced by compounding a high grease mineral oil, vegetable oil and animal oil alone or in an admixture thereof with graphite fluoride and a stabilizer (it is suitable for prevention of burning of a screw and packing and lubrication in running-in and the other usual rotating surfaces).
2. A paste prepared by compounding polyalkylene glycol with graphite fluoride and a stabilizer (it is suitable for prevention of burning and for lubrication of usual rotating surfaces and further is effective for lubrication of a highly heated portion of higher than 200° C. and rubber, plastic and the like).
3. A paste prepared by compounding a high grade silicone oil with graphite fluoride and a stabilizer (both properties of graphite fluoride and silicon can be developed and therefore it is effective for lubrication of parts in optical machines, precision machines, aircrafts and the like).
4. Aerosol charged the above pastes 1 to 3 in a container therefor (by this means the property of paste is improved and the adhesivity increases and further pastelike film can be easily formed in portions to be difficulty applied).
5. A completely colloidal dispersion of finely divided graphite fluoride of less than 1 $\mu$ and various stabilizers in high grade lubricating oil (it is effective for general lubrication of gear oil, hydraulic oil and the like and is preferable for running-in of new machines. When it is used as a cutting oil, the life of tool is extended and the precision of finishing of product is enhanced).
6. A colloidal dispersion of graphite fluoride in polyalkylene glycol liquid (it is effective for lubrication of conveyor and a chain exposed to a high temperature and a bearing at a temperature of higher than 250° C.).
7. A colloidal dispersion of graphite fluoride together with a vinyl organic binder and an epoxy organic binder in a volatile solvent, in which the volatile solvent is removed by drying or heating upon the use to form a preferable coated film of graphite fluoride (it is suitable for forming a dried film on portions where an applied load is low but an oil or a grease cannot be used).
8. The above colloidal dispersions 5 to 7 are impregnated into a porous element, such as sintered alloy to manufacture oilless element impregnated with oil (bearing, collector, etc.).
9. Freon-type jetting composition, in which the above solidifying dispersions 5 to 7 are charged in an aerosol container (it is conveniently used for portions difficulty applied).
10. Sticklike and other solid lubricants obtained by solidifying graphite fluoride with particular binders, such as high fatty alcohol, for example, wax (it is preferable for lubrication of rotating parts of various precision machines and particularly, to a dry lubrication).

The invention will be explained further in detail by the following Examples:

Example 1

Fiber grease 0250 having a consistency at 25° C. of 250±20 and a dropping point of 130° C. (made by DAIDOYUSHI K.K., flag color medium fiber grease) was added with each 10% by weight of molybdenum disulfide having a mean grain size of less than 0.5 $\mu$ (made by NIHON MOLYBDENUM KAGAKU KOGYO K.K., A powder) and graphite fluoride as described above (molecular formula: (CF)n, a mean grain size of less than 10 $\mu$), and the resulting mixture was stirred thoroughly, while heating gradually.

As a comparative sample for the above added grease, a grease containing 10% by weight of molybdenum disulfide having a consistency of 265 (made by SUMITOMO KINZOKU KOZAN K.K., Trade Mark: MOLYTHERM, for a high temperature) was prepared separately.

Figure 9:
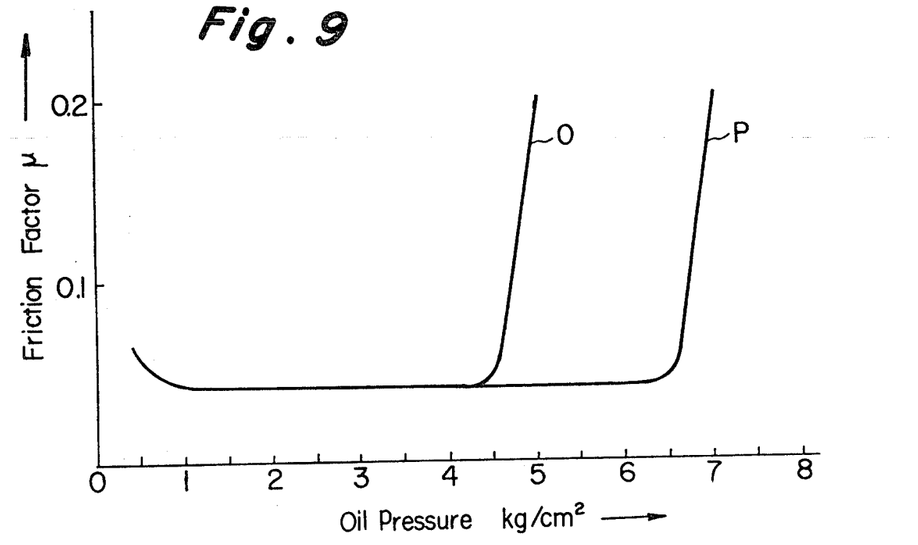

The test was made in a standard process by using SODA's four ball tester as shown in FIG. 9, which will be explained shortly hereinafter.

Figure 10:
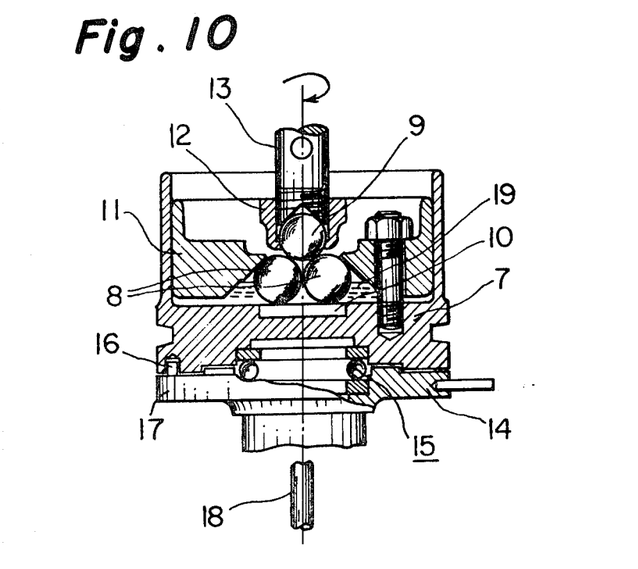

As shown in FIG. 10 the tester is provided with a sample container 7 and in this container there are provided with three stationary balls 8 and one rotating ball 9 which positions on a line passed through the center of these stationary balls 8 and contacts with the upper surface of these three balls 8. The stationary balls 8 are held against a stationary ball seat 10 provided on the bottom by the sample container 7 by a stationary ball retainer 11 and the rotating ball 3 is held by a rotating ball holder 12 provided at the lower end of a rotating axis 13. The sample container 7 is supported by a support 14 for the sample container 7 through a thrust bearing 15 and fixed to the support 14 by a fix pin 16. The support 14 is provided at the periphery thereof with an indicator 17 for torsion angle and is connected to a torsion bar 18 fixed to a base (not shown).

In the test, a sample 19 to be tested is filled in the sample container 7 of the above described tester and the rotating axis 13 is driven and the rotating ball 9 is rotated and thereafter a load is applied to the rotating ball 9, whereby a torsion angle is read on the indicator 17 as a function of friction power.

The load was added gradually from 0 Kg./cm.$^2$ at a rate of 0.5 Kg./cm.$^2$ in every minute by an oil pressure and discontinuous point of friction power was determined, which was referred to as burning load and the oil film strength was determined.

The test conditions are as follows:

| | |
|---|---|
| Rotating number of ball | 200 r.p.m. |
| Test ball | 3/4" high class steel ball for bearing (SUT-2) |
| Load rate | 0.5 Kg./cm.$^2$/(0–20 Kg./cm.$^2$) in every minute |
| Temperature | Room temperature |

From this test, the result as shown in FIG. 2 was obtained and further it has been found that even if graphite fluoride was mixed and added with conventional known powdery improvers, the effect of addition of graphite fluoride has never been adversely affected.

Example 2

Two fiber greases were prepared by adding 3% and 10% by weight of graphite fluoride as described above respectively to the fiber grease 0250 (made by DAIDO YUSHI K.K.) and stirring each of these mixtures thoroughly, while heating gradually and further as a sample grease the above described fiber grease was used alone. These three greases were tested according to the testing process in Example 1 and a result as shown in FIG. 3 was obtained.

Example 3

Cut grease 0250 having a consistency at 25° C. of 250±15 and a dropping point of higher than 90° C. (made by DAIDO YUSHI K.K., orange color medium grease) and a grease prepared by adding graphite fluoride as described above to the above described cut grease were tested in the same manner as described in Example 1 to obtain a result as shown in FIG. 4.

Example 4

A commercially available grease (TRADE MARK: HIGHTEMP GREASE No. 3, ash:7.2%, water content:0, mineral oil:85%, flashpoint of mineral oil:276° C., viscosity of mineral oil at 100° C.:31) and four greases, in which 0.5, 2, 5 and 10% by weight of graphite fluoride as described above were added to the above described grease respectively, were prepared for. These greases were tested by means of the tester as shown in FIG. 5, the rotation in every point being 1 hour. As the result, the effect resulting from the addition of graphite fluoride was as shown in FIGS. 6 and 7.

Example 5

Figure 8:
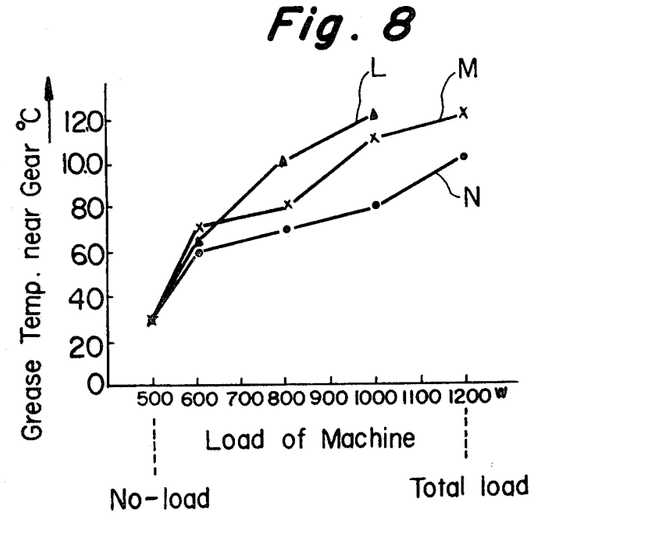

2% by weight of graphite fluoride was added to a commercially available fiber grease and the resulting mixture was stirred to prepare a sample. In order to confirm the effect of addition of graphite fluoride, the commercially available fiber grease and a fiber grease, in which 2% by weight of molybdenum disulfide is added to the same fiber grease, were prepared for. As a tester, a gearbox of an electric saw (100 v., 12 a.) made by PET, which can vary from 5,500 to 22,000 r.p.m. at the total load, was used, because the gear of such a gearbox not only evolves a heat owing to friction, but also evolves a high heat owing to impact upon the engaging. From this test, the result as shown in FIG. 8 was obtained. In FIG. 8 the abscissa shows the load of machine and the ordinate shows temperature of grease near the gear. The fiber grease alone (L) flows at 120° C. in a load of 1,000 w., the grease added with 2% by weight of molybdenum disulfide (M) flows at 120° C. in 1,200 w., that is the total load. On the contrary, in the grease added with 2% of graphite fluoride (N), the grease temperature is above 100° C. in the total load of 1,200 w. and the grease somewhat softens only and does not flow.

As seen from the above description, the improver of the present invention consists mainly of graphite fluoride, so that the lubricant added with this improver shows a stable and low friction factor in a broad field and an excellent lubricating ability in an extremely high pressure. Accordingly, it is useful to add graphite fluoride to lubricant for bearing, sliding surface and the like, which are driven under a severe condition.

Example 6

As a base oil, SAE030 was used and in one sample (0), this oil was used above and in another sample (P), this oil was added with 2% by weight of white powdery graphite fluoride as an improver. These two samples were tested by the four ball friction tester defined in JISK2517 (Four ball load resistance testing process of petroleum products) to determine a friction variation (the variation of friction factor can be confirmed by variation of torsion angle). The obtained result is shown in FIG. 9.

| Sample | Load limiting oil pressure of tester |
| --- | --- |
| Base oil alone | 4.5 Kg. |
| Added 2% by weight of graphite fluoride | 6.5 Kg. |

The above result shows that the effect of addition of graphite fluoride is high.

Example 7

A commercially available mobile oil (referred to as automobile oil, engine oil, motor oil and the like) passed JISK2216 No. 3 (lubricating oil for land engine) was used in an automobile and the automobile ran for a distance of 37,600 km. and the mobile oil blackened in an average distance of 3,000 km. and in the oil, slags such as water, sulfur, metal powder, sand, dust carbon and the like, increased and the lubricating property was lost, so that the oil had to be changed. On the other hand, the same mobile oil added with 3% by weight of graphite fluoride did not cause any trouble in 10,000 km. driving and the oil stain heretofore found did not occur.

Example 8

A gear of 1.5 ton Warner-type mixer for kneading carbon connected to 60 HP six pole three-phase alternate current motor had a speed reduction ratio of 20:1. This gearbox was used SAE090 gear oil. On the other hand, the gear oil was added with 5% by weight of graphite fluoride and this gear oil was used for the gearbox. As the result, the abrasion of the bearing and gear showed a durability 3 to 5 times that of the gear oil not added with graphite fluoride.

Example 9

For production of small screw, a cutter oil (JISK2241) has been used but in this case the abrasion of the cutting tool was large. On the other hand, when a cutter oil, in which 1.5% by weight of graphite fluoride was added to the same cutting oil, was used, the abrasion of the cutting tool was small and the life of the cutting tool was improved about 13%. Moreover, the finishing precision was improved and the working efficiency increased 40%.

What is claimed is:

1. A lubricant comprising a base oil and 0.05 to 60% by weight based on said base oil of a high molecular weight inorganic graphite fluoride having a formula of $(CF)_n$, n, in which carbon and fluorine are covalently bonded in a molar ratio of carbon and fluorine of 1:1 and which is obtained by reacting carbon or graphite with fluorine, halogen fluoride or a mixture thereof or a mixture of these substances with an inert gas or a higher fluorine compound at a temperature of lower than 550° C.

2. The lubricant as claimed in claim 1, wherein said base oil is at least one of lubricants selected from the group consisting of spindle oil, machine oil, hydraulic oil, gear oil, engine oil, silicone oil, diester oil, higher alcohols, animal and vegetable oils.

3. The lubricant as claimed in claim 1, in the form of a dispersion, paste, or wax at room temperature.

4. The lubricant as claimed in claim 1, wherein said graphite fluoride is graphite coated with a reaction product having the general formula of $(CF)_n$.

5. A lubricant, comprising a base oil and 0.05 to 60% by weight based on said base oil of a high molecular weight inorganic graphite fluoride having a formula of $(CF)_n$, in which carbon and fluoride are covalently bonded in a molar ratio of carbon and fluorine of 1:1 and which is obtained by reacting carbon or graphite with fluorine, halogen fluoride or a mixture thereof or a mixture of these substances with an inert gas or a higher fluorine compound at a temperature of lower than 550° C. and an effective amount of at least one substance selected from the group consisting of metal soap, bentonite, silica gel, cuprophthalocyanine, allyl urea, molybdenum disulfide, graphite, tungsten sulfide, lead oxide, boron nitride, stearic acid, lauric acid and silicone oil.

6. The lubricant as claimed in claim 5, which has a form of dispersion, paste, grease or wax at room temperature.